United States Patent
Viu et al.

(10) Patent No.: US 12,009,883 B2
(45) Date of Patent: Jun. 11, 2024

(54) UNIDIRECTIONAL DATA TRANSFER SYSTEM AND CORRESPONDING METHOD

(71) Applicant: TEREGA SOLUTIONS, Pau (FR)

(72) Inventors: Jésus Viu, Pau (FR); Christophe Holmes, Pau (FR)

(73) Assignee: TEREGA SOLUTIONS, Pau (FR)

( * ) Notice: Subject to any disclaimer, the term of this patent is extended or adjusted under 35 U.S.C. 154(b) by 71 days.

(21) Appl. No.: 17/640,737

(22) PCT Filed: Sep. 2, 2020

(86) PCT No.: PCT/EP2020/074476
§ 371 (c)(1),
(2) Date: Mar. 4, 2022

(87) PCT Pub. No.: WO2021/043830
PCT Pub. Date: Mar. 11, 2021

(65) Prior Publication Data
US 2022/0329285 A1    Oct. 13, 2022

(30) Foreign Application Priority Data

Sep. 5, 2019   (FR) ........................................ 1909761

(51) Int. Cl.
*H04B 3/50*        (2006.01)
*H04L 1/00*        (2006.01)

(52) U.S. Cl.
CPC ............. *H04B 3/50* (2013.01); *H04L 1/0041* (2013.01); *H04L 1/0045* (2013.01)

(58) Field of Classification Search
CPC . H04B 3/50; H04B 3/54; H04B 17/00; H04B 17/30; H04B 17/0082; H04L 1/0041; H04L 1/0045
See application file for complete search history.

(56) References Cited

U.S. PATENT DOCUMENTS

| | | | |
|---|---|---|---|
| 6,738,417 B1* | 5/2004 | Kim | G06F 3/14 375/220 |
| 2015/0215075 A1 | 7/2015 | Baek et al. | |
| 2016/0179595 A1* | 6/2016 | Wong | G06F 11/1004 714/704 |
| 2018/0109356 A1 | 4/2018 | Kim et al. | |
| 2019/0149557 A1 | 5/2019 | Falk et al. | |

FOREIGN PATENT DOCUMENTS

WO   2018104557 A1   6/2018

OTHER PUBLICATIONS

International Search Report mailed Nov. 3, 2020, issued in corresponding International Patent Application No. PCT/EP2020/074476, filed Sep. 2, 2020, 5 pages.

* cited by examiner

*Primary Examiner* — Khanh C Tran
(74) *Attorney, Agent, or Firm* — Christensen O'Connor Johnson Kindness PLLC

(57) ABSTRACT

The unidirectional data transfer system (3) comprises a data emitting device (5), a data receiving device (6) and a first unidirectional wire link (7) connecting the emitting and receiving devices such that the data passes from the emitting device to the receiving device.

The first wire link includes a non-controllable unidirectional component (8) and the unidirectional transfer system further includes a device (19a, 19b, 20) for monitoring the quality of the transferred data.

11 Claims, 3 Drawing Sheets

UNIDIRECTIONAL DATA TRANSFER SYSTEM AND CORRESPONDING METHOD

The present invention relates to the unidirectional data transmission systems and the implementation of such systems.

It relates more particularly to a unidirectional data transmission system by wire link, including a functionality for monitoring the data transmitted by said system.

Generally, sensitive industrial infrastructures, such as gas distribution networks, are driven by a secure operating computer network and not coupled to another computer network.

Industrial infrastructures are generally driven by industrial automatons connected to the operating computer network.

Consequently, the operating data of each industrial infrastructure is only available locally on the operating computer network.

However, the operating data, in particular pressure or temperature readings measured in a gas distribution network, can be operated by authorised users.

The operating data made available to authorised users must be reliable and consistent with the performed measurement readings.

In order to share operating data, the operating computer network may be connected to a generally larger and less secure network (such as the Internet).

In order to maintain the security of the operating computer network, no data from the larger network should pass through the operating computer network.

The operating data must, on the one hand, circulate from the operating computer network to the larger network, and on the other hand, the quality of the transmitted data must be verified so that the transmitted operating data is reliable and complies with the performed measurement readings.

If a quality defect of the transferred data is detected, new data can be transferred to replace the corrupted data.

Reference may be made to the document WO 2008/131025 which discloses a system for a unidirectional data transfer.

The system comprises a data sending network interface card connected by a copper wire communication cable to a data receiving network interface card.

The sending interface card exclusively comprises the portion of the sending connector necessary to transmit data.

The receiving interface card exclusively comprises the portion of the receiving connector necessary to receive data.

The sending and receiving interface cards are connected to the communication cable.

However, this system does not include a device for monitoring the transferred data.

In addition, this system requires adapting the interface cards by removing one of the connectors.

The document WO 2018/193277 discloses a system for transferring data unidirectionally, comprising an emitter module including a light source and no light sensor, and a receiver module comprising a light sensor and no light source, the two modules being connected by an optical fibre such that the light beam emitted by the light source of the emitter module is received by the light sensor of the receiver module.

The transmitted data may further comprise verification and error check data.

If an error is detected, an email or a message transmitted by telephone message service is emitted to prevent a malfunction of the unidirectional data transmission device.

However, the system transmits the data in the form of light messages requiring dedicated computer means to transcribe digital data into light messages and conversely, and complicating the system by the use of optical fibres.

In addition, if corrupted data is transmitted, the system alerts that a transmission error has occurred without remedying it.

The document WO 2019/040438 discloses a unidirectional information flow monitoring system comprising an emitting interface card and a receiving interface card connected by a wire link.

According to another embodiment, the emitting and receiving interface cards are connected by an optical fibre.

However, this system does not include a device for monitoring the transferred data.

The document EP 3 040 873 discloses an electronic system allowing transferring data between different networks having different levels of sensitivity.

The electronic system comprises electronic data processing modules interconnected in pairs and unidirectional data transfer links.

The two modules of a respective pair are connected to each other via two respective unidirectional data transfer links arranged in opposite directions.

Each unidirectional link includes a controllable unidirectional component between an activated data transfer configuration and a deactivated data blocking configuration, the controllable unidirectional component being for example a transistor or a thyristor.

However, the unidirectional components are controlled such that each unidirectional link is not autonomous and is likely to fail or to be hacked resulting in an unwanted data transmission likely to hack the most secure data network.

Furthermore, the electronic system does not include a monitoring of the quality the transferred data.

The object of the invention is to overcome all or part of these drawbacks.

In the light of the above, the invention proposes a unidirectional data transfer system comprising a data emitting device, a data receiving device and a first unidirectional wire link connecting the emitting and receiving devices such that the data passes from the emitting device to the receiving device.

The first wire link includes a non-controllable unidirectional component and the unidirectional transfer system further includes a device for monitoring the quality of the transferred data.

According to one feature, the non-controllable unidirectional component includes a diode.

Preferably, the device for monitoring the quality of the transferred data includes, in each of the emitting and receiving devices, a module for calculating an error check code comprising the same algorithm for calculating the check code, means for comparing check codes incorporated into the emitting device configured to compare a check code received via the first wire link and a check code calculated by the calculation module of the receiving device from the received data, and a second wire link connecting the emitting and receiving devices.

Advantageously, the data emitting device comprises a serial parallel data converter connected to the first wire link and to a parallel data bus so as to transmit the data passing on the parallel data bus to the first wire link.

According to another feature, the data receiving device comprises a parallel serial data converter connected to the first wire link, and a parallel data bus connected to the converter such that the contained data circulating on the first unidirectional wire link passes through the parallel bus.

Preferably, the data receiving device further includes a communication interface and an encryption module, the communication interface being configured to transmit the data passing on the parallel bus encrypted by the encryption module.

The invention also relates to a distribution network comprising at least one device for controlling said network, and a unidirectional data transfer system as previously defined connected to the control device so as to transmit a control variable generated by the control device The invention further relates to a unidirectional data transfer method comprising the emission of a data frame by an emitting device and the reception of said frame by a receiving device.

The method further includes a monitoring of the quality of the transferred data, the frame circulating through a first non-controllable unidirectional wire link connecting said emitting and receiving devices.

According to one feature, the emission of a data frame includes converting data transmitted by a parallel bus into a serial data frame and transmitting the serial data frame over the first wire link.

Advantageously, the reception of the data frame includes the conversion of said serial data frame received by the first wire link into data intended to be transmitted by a parallel bus.

Preferably, the monitoring of the quality of the transferred data includes the calculation of a first check code by the emitting device from data of the frame and an algorithm for calculating the check code, the insertion of the first code in the serial data frame before the emission of said serial data frame, the calculation of a second check code by the receiving device from the frame by implementing the algorithm for calculating the check code, the comparison of the first and second check codes, and the transmission of an error message by the receiving device to the emitting device if the first and second codes are not identical, the message passing through a second wire link connecting said devices.

According to another feature, the method includes the encryption of the received data and the transmission of the encrypted data by the receiving device.

Advantageously, the method includes the configuration of the receiving device via the first non-controllable unidirectional wire link.

Other aims, features and advantages of the invention will appear on reading the following description, given only by way of non-limiting example, and made with reference to the appended drawings in which.

Figure 1:
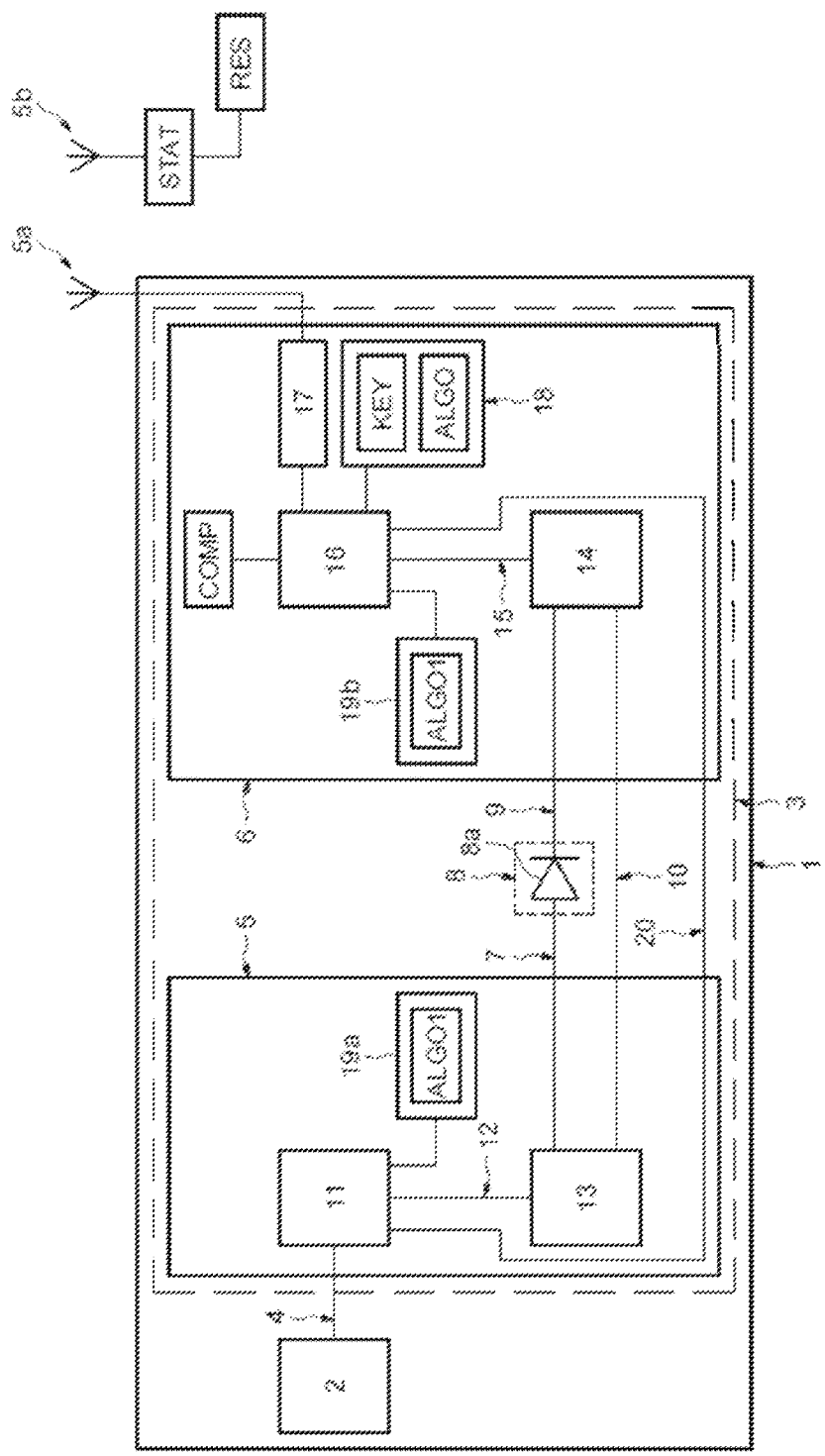
FIG. 1 illustrates an example of a distribution network according to the invention.

Reference is made to FIG. 1 which illustrates an embodiment of a distribution network 1 comprising a control device 2 connected to a unidirectional data transfer system 3 so as to transmit a control variable generated by the control device 2.

The control device 2 is connected to the system 3 via a computer network 4.

The distribution network 1 comprises for example a gas distribution network intended to supply industrial infrastructures.

The control device 2 comprises for example a network monitoring member, such as a gas flow rate regulation valve in a conduit of the network 1, or comprises for example a measuring member, such as a sensor for measuring the temperature or the pressure of the gas circulating in a conduit of the network 1.

The system 3 is further connected to an antenna 5a.

The unidirectional data transfer system 3 comprises a data emitting device 5, a data receiving device 6 and a first unidirectional wire link 7.

The first wire link 7 connects the emitting 5 and receiving 6 devices such that data passes from the emitting device 5 to the receiving device 6.

The first wire link 7 includes a non-controllable unidirectional component 8.

The first wire link 7 is for example of the RS232 type and comprises two cables 9 and 10.

The first cable 9 comprises the non-controllable unidirectional component 8 disposed such that data passes from the emitting device 5 to the receiving device 6, and a second reference cable 10, for example of zero potential.

The non-controllable unidirectional component 8 is for example a diode 8a whose anode is connected to the emitting device 5 and the cathode is connected to the receiving device 6.

The non-controllable unidirectional component 8 prevents the transmission of data from the receiving device 6 to the emitting device 5 intrinsically, that is to say without being controlled, the component 8 cannot be hacked.

The unidirectional transfer system 3 further includes a device for monitoring the quality of the transferred data.

The emitting device 5 comprises an emission controller 11 connected to the computer network 4, a parallel data bus 12 connected to an output of the emission controller 11 and to an input of a serial parallel data converter 13, an output of the serial parallel data converter 13 being connected to the first wire link 7 so as to transmit the data passing on the parallel data bus 12 to the first wire link 7.

The serial parallel data converter 13 prevents data from passing from the first wire link 7 to the bus 12, making the unilateral transmission of data even more secure in complementarity with the non-controllable unidirectional component 8.

The emission controller 11 comprises for example a processing unit conditioning the data received from the computer network 4 and sending the conditioned data on the bus 12.

It can be any device capable of conditioning the data received from the computer network 4 and sending the conditioned data on the bus 12.

The receiving device 6 comprises a parallel serial data converter 14 connected to the first wire link 7, a parallel data bus 15 connected to the converter 14, and a reception controller 16 connected to the bus 15, such that the data circulating on the first wire link 7 passes through the parallel bus 15 to the reception controller 16.

The serial parallel data converter 14 prevents data from passing from the bus 15 to the first wire link 7, making the unilateral transmission of data even more secure in complementarity with the non-controllable unidirectional component 8 and the serial parallel data converter 13.

The receiving device 6 further includes a communication interface 17 connected to the reception controller 16 and to the antenna 5, and an encryption module 18 connected to the reception controller 16.

The encryption module 18 comprises an encryption algorithm ALGO and an encryption key KEY.

The controller 16 implements the encryption module 18 to encrypt the data received by the bus 16 and transmits the encrypted data to the interface 17.

The reception controller 16 comprises for example a processing unit encrypting the data received via the bus 15 from the ALGO algorithm and the encryption key KEY, and transmitting the encrypted data to the interface 17.

It can be any device capable of receiving data from the bus 15, encrypting the data received from the module 18 and transmitting the encrypted data to the interface 17.

The interface 17 is configured to transmit the encrypted data transmitted by the reception controller 16 to a reception station STAT including an antenna 5b.

The transmission of the data between the interface 17 and the station STAT is performed for example by a radio link or by a telephone link for example of the GSM, UMTS, LTE type.

The receiving station STAT is for example connected to a computer network RES which is less secure than the network 4 and accessible to authorised users who need to know the data generated by the control device 2.

The device for monitoring the quality of the transferred data includes a module 19a, 19b for calculating an error check code in each of the emitting 5 and receiving 6 devices, each calculation module 19a, 19b comprising an algorithm ALGO1 for calculating the check code, means for comparing check codes COMP and a second wire link 20 connecting the emission 11 and reception 16 controllers.

The second wire link 20 includes a potential-free contact.

The calculation module 19a is connected to the emission controller 11 and the second calculation module 19b is connected to the reception controller 16.

The comparison means COMP are incorporated into the transmission device 6, connected to the controller 16 and configured to compare a first check code received via the first wire link 7 and a second check code calculated by the calculation module 19 of the receiving device 6 from the received data.

The means COMP are for example made from logic gates.

The execution of the algorithm ALGO1 generates for example a cyclic redundancy check code.

Of course the algorithm ALGO1 can be configured to generate another type of check code.

Figure 2:
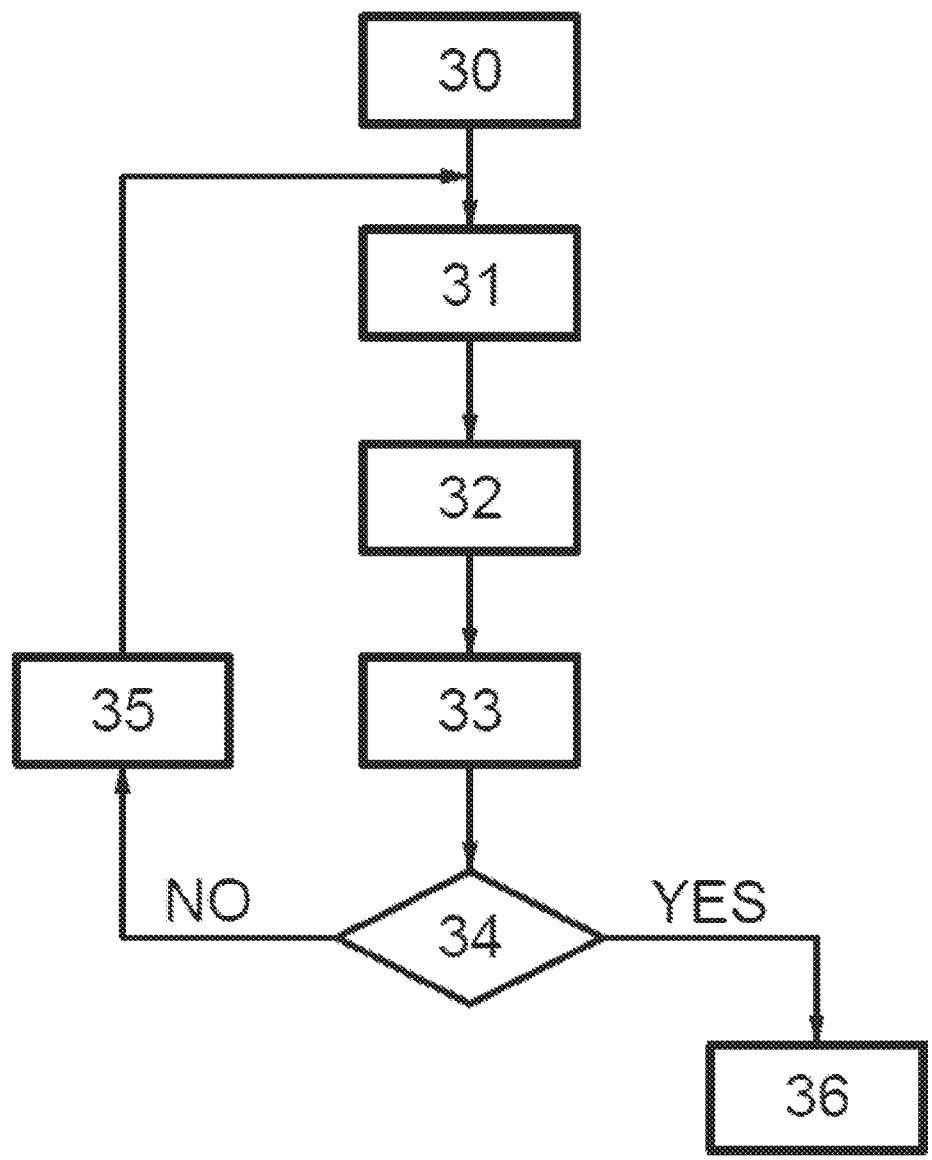
FIG. 2 illustrates a first implementation of the unidirectional data transfer system according to the invention.

FIG. 2 illustrates a first implementation of the unidirectional data transfer system 3.

Prior to the transmission of data from the system 3 to the station STAT, the communication interface 17 is configured to communicate with the station STAT, for example by configuring the emission frequency of the interface 17 in the case of a radio link or a SIM (Subscriber Identity Module) chip in the case of a telephone link.

During a step 30, the configuration data of the interface 17 are transmitted from the network 4 to the emission controller 11.

Then, during a step 31, the emission controller 11 calculates a first check code from the algorithm ALGO1 of the calculation module 19a and the received data, generates a first frame containing the received data and the first check code, and transmits the first frame to the data converter 13 via the parallel bus 12.

During a step 32, the data converter 13 creates a second frame containing the data of the first frame.

The second frame is configured to be transmitted by the wire link 7 of the serial data bus type.

The data converter 13 transmits the second frame to the data converter 14 via the first unidirectional wire link 7.

During step 33, the converter 14 creates a third frame containing the data of the second frame received by the wire link 7.

The third frame is configured to be transmitted to the reception controller 16 via the parallel bus 15.

The data converter 14 transmits the third frame to the reception controller 16.

During step 34, the reception controller 16 calculates a second check code from the algorithm ALGO1 of the calculation module 19b and the data of the third frame, and compares the first and second check codes.

If the first and second check codes are not identical, the reception controller 16 transmits an error message to the emission controller 11 via the second wire link 20 (step 35).

The error message is configured to inform the emission controller 11 that the transmitted data is corrupt.

The emission controller 11 can again attempt to transmit the received data (step 31).

The controller 11 can be configured to retransmit the same data received each time an error message is received or according to a predetermined number of times.

The reception controller 16 emits an error message only when the first and second check codes are not identical, that is to say when the data, contained in the frame, received via the wire link 7 is corrupt.

If the first and second codes are identical, the reception controller 16 configures the interface 17 from the data of the third (step 36).

Of course, the configuration of the encryption key KEY, of the algorithms ALGO and ALGO1 is performed in the same manner as the configuration of the interface 17 by adapting the transmitted configuration data.

Figure 3:
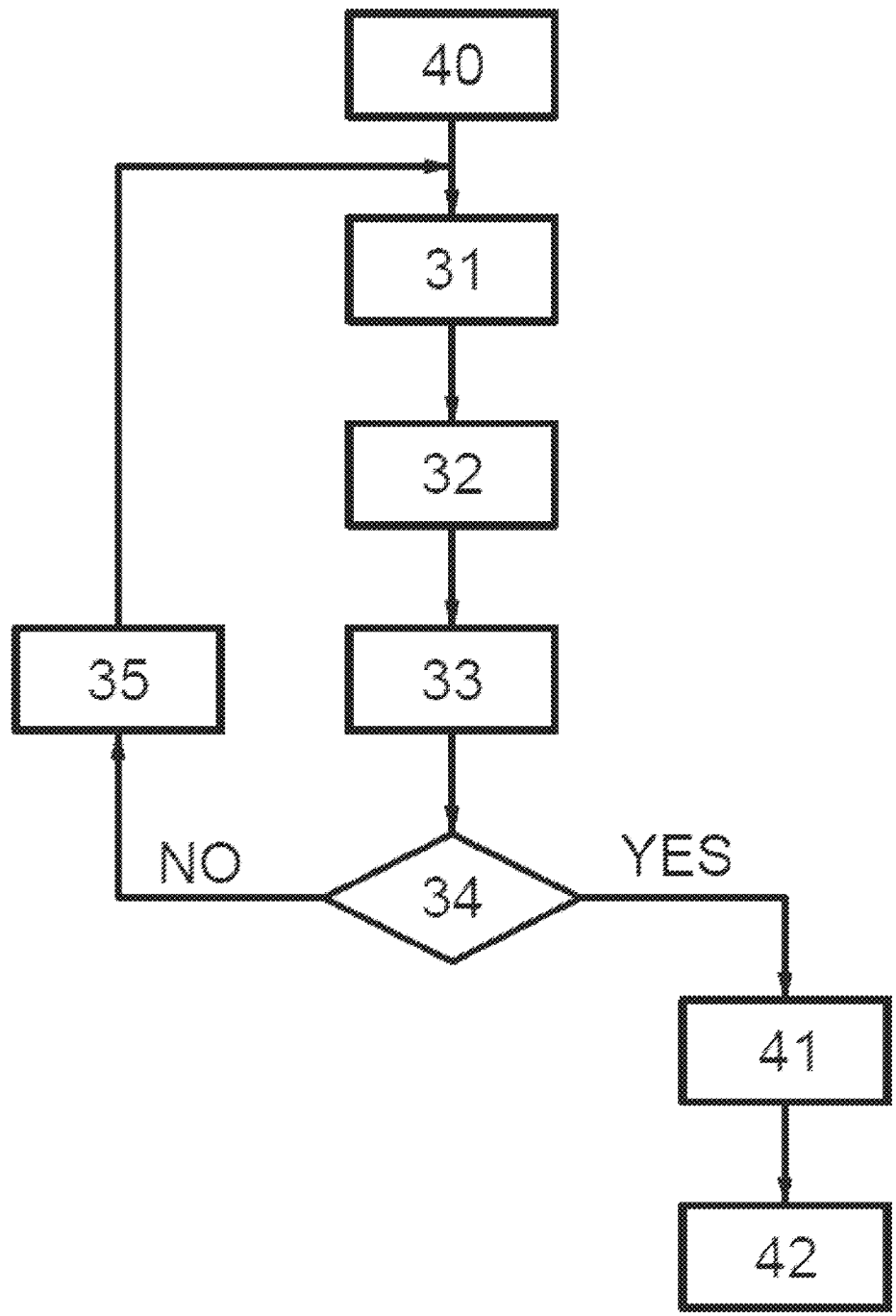
FIG. 3 illustrates a second implementation of the unidirectional data transfer system according to the invention.

FIG. 3 illustrates a second implementation of the unidirectional data transfer system 3.

It is assumed that the interface 17 is configured to communicate with the station STAT, and that the modules 18 and 19 are configured.

During a step 40, the emission controller 11 receives control data generated by the control device 2 via the network 4.

The method continues with the following steps 31, 32, 33 and 34.

If the first and second check codes are not identical, step 35 is continued.

Alternatively, if the first and second check codes are not identical, the controller 16 can be configured not to transmit the corrupted data to the interface 17 such that the corrupted data is not available on the RES network.

If the first and second check codes are identical, during a step 41, the reception controller 16 encrypts the data of the third frame by implementing the encryption module 18 and transmits the encrypted data of the third frame to the interface 17.

During the following step 42, the interface 17 transmits the encrypted data to the station STAT.

The unidirectional data transfer system 3 is made from components which are standard and simple to implement.

The system 3 has a high level of security of unidirectional data transmission by making three physical unidirectional data barriers by implementing the non-controllable unidirectional component 8 and the data converters 13 and 14.

In addition, the system 3 comprises the device for monitoring the transmitted data allowing retransmitting data if the transmission has not occurred in a compliant manner.

Furthermore, the configuration of the receiving device 6 is performed exclusively by the first wire link 7 preventing any hacking of the system 3.

The invention claimed is:

1. A system (3) for unidirectional data transfer comprising a data emitting device (5), a data receiving device (6) and a first unidirectional wire link (7) connecting the emitting and receiving devices such that the data passes from the emitting device to the receiving device, the first wire link including a non-controllable unidirectional component (8), the unidirectional transfer system further including a device (19a, 19b, 20) for monitoring the quality of the transferred data, characterised in that the device (19a, 19b, 20) for monitoring the quality of the transferred data includes, in each of the emitting (5) and receiving (6) devices, a module (19a, 19b) for calculating an error check code comprising the same algorithm (ALGO1) for calculating the check code, means (COMP) for comparing check codes incorporated into the emitting device configured to compare a check code received via the first wire link (7) and a check code calculated by the calculation module (19b) of the receiving device from the received data, and a second wire link (20) connecting the emitting and receiving devices, wherein the receiving device is further configured to transmit an error message to the emitting device if the check codes are not identical, the message passing through the second wire link.

2. The system according to claim 1, wherein the non-controllable unidirectional component (8) includes a diode (8a).

3. The system according to claim 1, wherein the data emitting device (5) comprises a serial parallel data converter (13) connected to the first wire link (7) and to a parallel data bus (12) so as to transmit the data passing on the parallel data bus to the first wire link.

4. The system according to claim 1, wherein the data receiving device (6) comprises a parallel serial data converter (14) connected to the first wire link (7), and a parallel data bus (15) connected to the converter such that the data circulating on the first unidirectional wire link passes through the parallel bus.

5. The system according to claim 4, wherein the data receiving device (6) further includes a communication interface (17) and an encryption module (18), the communication interface being configured to transmit the data passing on the parallel bus (15) encrypted by the encryption module.

6. A distribution network (1) comprising at least one device (2) for controlling said network and a unidirectional data transfer system (3) according to claim 1 connected to the control device so as to transmit a control variable generated by the control device.

7. A unidirectional data transfer method comprising the emission of a data frame by a data emitting device (5) and the reception of said frame by a data receiving device (6), the method further including a monitoring of the quality of the transferred data, the frame circulating through a first non-controllable unidirectional wire link (7) connecting said emitting and receiving devices, wherein the monitoring of the quality of the transferred data includes the calculation of a first check code by the data emitting device (5) from data of the frame and an algorithm (ALGO1) for calculating the check code, the insertion of the first code in the serial data frame before the emission of said serial data frame, the calculation of a second check code by the receiving device (6) from the frame and the algorithm (ALGO1) for calculating the check code, the comparison of the first and second check codes, and the transmission of an error message by the receiving device to the emitting device if the first and second codes are not identical, the message passing through a second wire link (20) connecting said devices.

8. The method according to claim 7, wherein the reception of the data frame includes the conversion of said serial data frame received by the first wire link (7) into data intended to be transmitted by a parallel bus (15).

9. The method according to claim 7, comprising the encryption of the received data and the transmission of the encrypted data by the receiving device (6).

10. The method according to claim 7, comprising the configuration of the receiving device (6) via the first non-controllable unidirectional wire link (7).

11. The method according to claim 7, characterised in that the emission of a data frame includes converting data transmitted by a parallel bus (12) into a serial data frame and transmitting the serial data frame over the first wire link (7).

* * * * *